US009446773B2

(12) United States Patent
Kim et al.

(10) Patent No.: US 9,446,773 B2
(45) Date of Patent: Sep. 20, 2016

(54) SYSTEM AND METHOD FOR ASSISTING DRIVER

(71) Applicants: Hyundai Motor Company, Seoul (KR); Kia Motors Corporation, Seoul (KR)

(72) Inventors: Heegwon Kim, Seoul (KR); Je Ir Ryu, Seoul (KR); Seunggil Choi, Gyeonggi-Do (KR); Jeong Woo Lee, Gyeonggi-Do (KR); Ho Sik Lee, Seoul (KR); Chae Mo Yang, Gyungg-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 161 days.

(21) Appl. No.: 14/144,204

(22) Filed: Dec. 30, 2013

(65) Prior Publication Data

US 2015/0183364 A1 Jul. 2, 2015
US 2016/0243977 A9 Aug. 25, 2016

(30) Foreign Application Priority Data

Jul. 8, 2013 (KR) .......................... 10-2013-0079740

(51) Int. Cl.
*B60Q 1/00* (2006.01)
*B60W 50/14* (2012.01)
*B60K 35/00* (2006.01)

(52) U.S. Cl.
CPC .............. *B60W 50/14* (2013.01); *B60K 35/00* (2013.01); *B60K 2350/1092* (2013.01)

(58) Field of Classification Search
CPC ........................ B60W 10/06; B60W 30/18072
See application file for complete search history.

(56) References Cited

U.S. PATENT DOCUMENTS

| 2012/0232741 A1* | 9/2012 | Sekiyama et al. ........... 701/29.1 |
| 2013/0124077 A1* | 5/2013 | Kim et al. ..................... 701/123 |
| 2014/0067225 A1* | 3/2014 | Lee et al. ......................... 701/93 |
| 2014/0176321 A1* | 6/2014 | Chen et al. .................. 340/435 |
| 2014/0371974 A1* | 12/2014 | Huelsebusch et al. ......... 701/23 |

FOREIGN PATENT DOCUMENTS

| JP | 2006-111183 A | 4/2006 |
| JP | 2010-183687 A | 8/2010 |
| KR | 10-2009-0062520 A | 6/2009 |

* cited by examiner

*Primary Examiner* — Benjamin C Lee
*Assistant Examiner* — Rajsheed Black-Childress
(74) *Attorney, Agent, or Firm* — Mintz Levin Cohn Ferris Glovsky and Popeo, P.C.; Peter F. Corless

(57) ABSTRACT

A system and method for assisting a driver are provided. The method includes receiving, by a controller, vehicle traveling information and calculating a first distance between a present vehicle position and an end node. In addition, the controller is configured to calculate a second distance between the present vehicle position and a preceding vehicle based on the receiving information and calculate a third distance in which coasting is available until a present vehicle speed reaches a predetermined target speed. The method further includes determining, by the controller, whether coasting is available based on the first distance, the second distance, the third distance in which coasting is available, and a present vehicle speed of the vehicle, and outputting, when coasting is available, a message that instructs coasting.

11 Claims, 2 Drawing Sheets

SYSTEM AND METHOD FOR ASSISTING DRIVER

CROSS-REFERENCE TO RELATED APPLICATION

This application claims priority to and the benefit of Korean Patent Application No. 10-2013-0079740 filed in the Korean Intellectual Property Office on Jul. 8, 2013, the entire contents of which are incorporated herein by reference.

BACKGROUND (a) Field of the Invention

The present invention relates to a system and method for assisting a driver. More particularly, the present invention relates to a system and method for assisting a driver by outputting a message that instructs coasting to a driver.

(b) Description of the Related Art

Due to shortage of an energy resource, interest has rapidly increased in an environmentally-friendly eco driving method for protecting the environment and saving energy resources. Efforts have been made toward management of indexes, for example, silence traveling and prevention of quick start and quick braking, having an influence on eco driving. Further, efforts have been made toward coasting (e.g., non-powered traveling) that travels by inertia in an idle state without engaging an accelerator pedal. Particularly, in an electric vehicle, energy consumption of the electric vehicle changes rapidly based on power traveling, regenerative braking, coasting, a wind direction, and a wind velocity.

However, it may be difficult to effectively improve fuel consumption only with an effort of a driver due to a constantly varying road and traffic situation. In other words, for a driver to improve fuel consumption, when performing coasting by depending on only a visual field, release (e.g., disengagement) of an accelerator pedal may not be performed in sufficient time. Therefore, a method of assisting a driver that may maximize a coasting distance by providing a message that instructs coasting to a driver based on vehicle information and front road information may be required.

The above information disclosed in this section is merely for enhancement of understanding of the background of the invention and therefore it may contain information that does not form the prior art that is already known in this country to a person of ordinary skill in the art.

SUMMARY

The present invention provides a system and method for assisting a driver having advantages of outputting a message that instructs coasting to a driver to maximize a coasting distance by collecting information for traveling.

An exemplary embodiment of the present invention provides a driver assistance system that may include: an information collection unit configured to collect information for vehicle traveling; a controller configured to determine whether coasting is available based on the collected information; and an output unit configured to output a message that instructs coasting, when coasting is available. The information collected by the information collection unit may include vehicle position information, vehicle speed information, vehicle weight information, weather information, inter-vehicle distance information, three-dimensional geography information, and traffic information.

The three-dimensional geography information may include node information, and the controller may include a distance calculation unit configured to calculate a distance $D1$ between a present position of the vehicle and an end node based on the node information and a distance $D2$ between a present position of the vehicle and a preceding vehicle based on the inter-vehicle distance information. The three-dimensional geography information may include road slope information and road curvature information, and the controller may further include a traveling resistance calculation unit configured to calculate a traveling resistance value based on the vehicle weight information, the weather information, the road slope information, and the road curvature information.

In addition, the controller may further include a map table generator configured to generate a map table of a coasting distance that corresponds to a vehicle speed based on the traveling resistance value. The distance calculation unit may be configured to calculate a distance $D3$ in which coasting is available until a present vehicle speed reaches a predetermined target speed based on the map table. The controller may further include a determining unit configured to determine whether coasting is available by comparing a distance $D1$ between a present vehicle position and an end node, a distance $D2$ between a present position of the vehicle and a preceding vehicle, and a distance $D3$ in which coasting is available.

Further, the determining unit may be configured to compare the distance $D1$ between a present vehicle position and an end node and the distance $D3$ in which coasting is available, when the distance $D2$ between a present position of the vehicle and a preceding vehicle is equal to or greater than the distance $D1$ between a present vehicle position and an end node and may be configured to determine that coasting is available, when the distance $D3$ in which coasting is available is equal to or greater than the distance $D1$ between a present vehicle position and an end node. The determining unit may be configured to compare the distance $D2$ between a present position of the vehicle and a preceding vehicle and the distance $D3$ in which coasting is available, when the distance $D2$ between a present position of the vehicle and a preceding vehicle is less than the distance $D1$ between a present vehicle position and an end node and may be configured to determine that coasting is available, when the distance $D3$ in which coasting is available is equal to or greater than the distance $D2$ between a present position of the vehicle and a preceding vehicle. The determining unit may further be configured to determine that coasting is available, when a present speed of the vehicle is equal to or greater than a predetermined speed.

Another exemplary embodiment of the present invention provides a method of supporting a driver, the method may include: collecting information for traveling of a vehicle; calculating a distance $D1$ between a present vehicle position and an end node and a distance $D2$ between a present position of the vehicle and a preceding vehicle based on the collected information; calculating a distance $D3$ in which coasting is available until a present vehicle speed reaches a predetermined target speed; determining whether coasting is available based on the distance $D1$ between a present vehicle position and an end node, the distance $D2$ between a present position of the vehicle and a preceding vehicle, the distance $D3$ in which coasting is available, and a present vehicle speed; and outputting, when coasting is available, a message that instructs coasting.

The collected information may include vehicle position information, vehicle speed information, vehicle weight information, weather information, inter-vehicle distance information, three-dimensional geography information, and traffic information. The three-dimensional geography information may include road slope information and road curvature information, and the calculating of a distance D3 in which coasting is available may include calculating a traveling resistance value based on the vehicle weight information, the weather information, the road slope information, and the road curvature information; and generating a map table of a coasting distance based on a vehicle speed based on the traveling resistance value, wherein the distance D3 in which coasting is available may be calculated based on the map table.

The determining of whether coasting is available may include determining that coasting is available, when the distance D2 between a present vehicle position and a preceding vehicle is equal to or greater than the distance D1 between a present vehicle position and an end node, when the distance D3 in which coasting is available is equal to or greater than the distance D1 between a present vehicle position and an end node, and when a present vehicle speed is equal to or greater than a predetermined speed. The determining of whether coasting is available may include determining that coasting is available, when the distance D2 between a present vehicle position and a preceding vehicle is less than the distance D1 between a present position of the vehicle and an end node, when the distance D3 in which coasting is available is equal to or greater than the distance D2 between a present position of the vehicle and a preceding vehicle, and when a present vehicle speed is equal to or greater than a predetermined speed.

Figure 1:
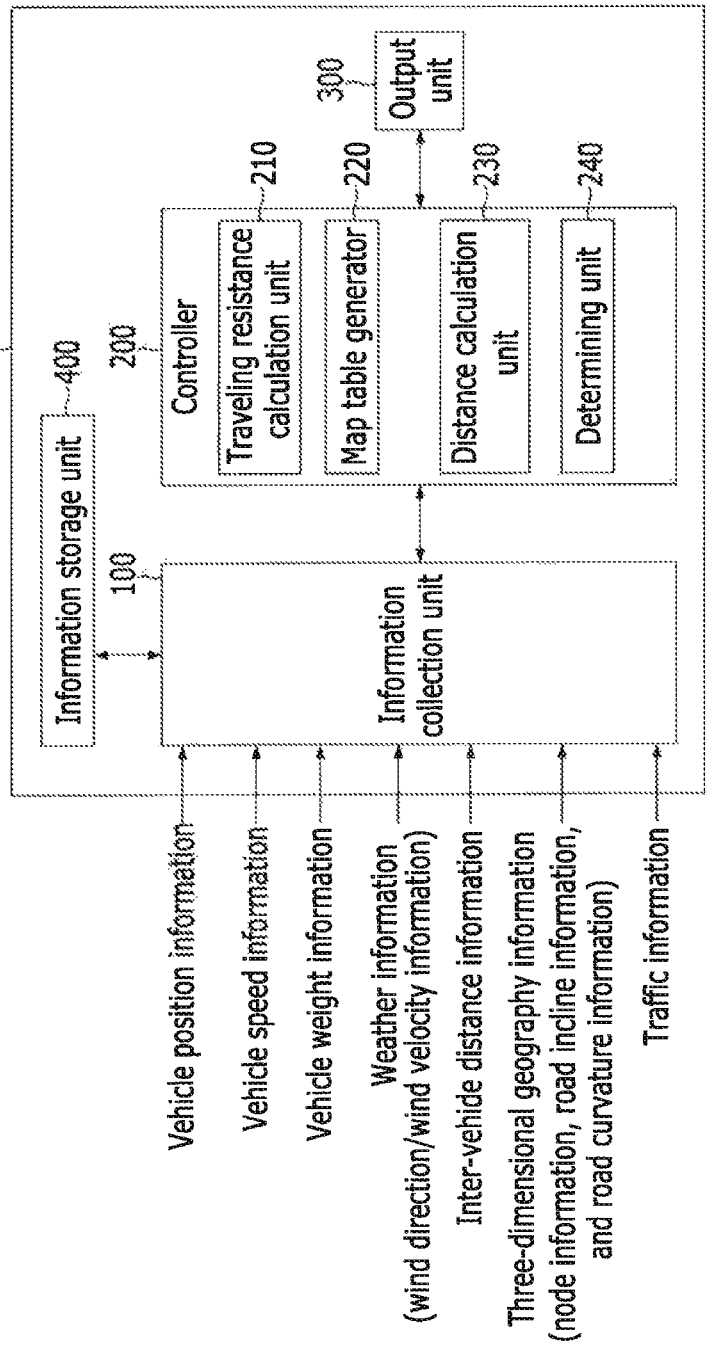
FIG. 1 is an block diagram illustrating a driver assistance system according to an exemplary embodiment of the present invention.

| Description of symbols | |
|---|---|
| 10: driver assistance system | 100: information collection unit |
| 200: controller | 210: traveling resistance calculation unit |
| 220: map table generator | 230: distance calculation unit |
| 240: determining unit | 300: output unit |
| 400: information storage unit | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. However, the present invention is not limited to an exemplary embodiment described here but may be exemplified in other forms. The drawings and description are to be regarded as illustrative in nature and not restrictive. Like reference numerals designate like elements throughout the specification. Further, in the drawings, a size and thickness of each element are randomly represented for better understanding and ease of description, and the present invention is not limited thereto.

FIG. 1 is an exemplary block diagram illustrating a driver assistance system according to an exemplary embodiment of the present invention. Referring to FIG. 1, a driver assistance system 10 according to an exemplary embodiment of the present invention may include an information collection unit 100, a controller 200, and an output unit 300. The controller 200 may be configured to execute the information collection unit 100 and the output unit 300. The driver assistance system 10 may further include an information storage unit 400 configured to store information collected by the information collection unit 100.

In particular, the information collection unit 100 may be installed extraneous to a vehicle or may be disposed within a vehicle part and may be configured to collect vehicle traveling information. The information collected by the information collection unit 100 may include vehicle position information, vehicle speed information, vehicle weight information, weather information, inter-vehicle distance information, three-dimensional geography information, and traffic information.

The collected information may be information managed and acquired via various sensors and navigation systems disposed within the vehicle in real time while traveling or information measured by another device and may be interlocked with the driver assistance system 10 via a wired or wireless communication network to be collected by the information collection unit 100. Particularly, information acquired via various sensors and navigation systems disposed within the vehicle may be transferred via a communication control system within the vehicle. Such a communication control system within the vehicle may use controller area network (CAN) communication of a high speed. The collected information may be transferred to the information storage unit 400 and may be stored and classified by the information storage unit 400 and may be formed in a database by the information storage unit 400. Information collected by the information collection unit 100 may be transferred to the controller 200. Further, among information stored by the information storage unit 400, necessary information may be extracted and transferred to the controller 200.

Furthermore, to reduce a system load, a transmitting cycle of the collected information to the controller 200 may be set in a unit of about 100 ms. The weather information may include snow, rain, wind direction, and wind velocity information. The inter-vehicle distance information may be collected from a radar or infrared ray sensor and may include information regarding a distance between a present vehicle position and a preceding vehicle.

The three-dimensional geography information may include node information, road slope information, and road curvature information. The three-dimensional geography information may be advanced driver assistance system (ADAS) map information. Since it may be difficult to accurately calculate consumed energy and fuel consumption efficiency when the vehicle is traveling with two-dimensional geography information, it may be difficult to apply the two-dimensional geography information to an echo driving system. Therefore, three-dimensional geography information to which a slope of a road, i.e., a slope is reflected may be applied to an echo driving system.

In this specification, a 'node' may be an element that is a determining reference of coasting such as an overspeed sign (e.g., a speed limit sign), a speed camera (e.g., imaging device, video camera, etc.), a speed bump, a tollgate, a railroad, and a traffic light as well as a network element that corresponds to an intersection of an actual road. In addition, a 'link' may be a network element that represents a connection segment on an actual road, which is a connection portion between nodes and indicates a network connection segment formed with a start node and an end node. Therefore, the node information may include information regarding a position and an attribute of a node. For example, when a node is an overspeed sign, the node information may include a position of an overspeed sign and information regarding the speed limit. The traffic information may include information regarding a traffic congestion situation due to a traffic amount and a traffic accident at a downtown road, a suburban road, or an express highway.

The controller 200 may be realized by one or more microprocessors activated by a predetermined program, and the predetermined program may include a series of commands to perform each step included in a method of assisting a driver of an exemplary embodiment of the present invention to be described later. The controller 200 may be configured to execute a plurality of units. The plurality of units may include a traveling resistance calculation unit 210, a map table generator 220, a distance calculation unit 230, and a determining unit 240 and the controller may be configured to determine whether coasting is available based on the collected information.

The traveling resistance calculation unit 210 may be configured to calculate a traveling resistance value based on the vehicle weight information, the weather information, the road slope information, and the road curvature information. In other words, the traveling resistance value may change based on a vehicle weight, a wind direction, a wind velocity, and a slope and a curvature of a road. The map table generator 220 may be configured to generate a map table of a coasting distance that corresponds to a vehicle speed based on a traveling resistance value calculated by the traveling resistance calculation unit 210. In other words, when a traveling resistance value is determined, a distance in which coasting is available may be generated in a map table based on each vehicle speed.

The distance calculation unit 230 may be configured to calculate a first distance D1 between a present vehicle position and an end node based on the node information and calculate a second distance D2 between a present vehicle position and a preceding vehicle based on the inter-vehicle distance information. The distance calculation unit 230 may further be configured to calculate a third distance D3 in which coasting is available based on the map table until a present vehicle speed reaches a predetermined target speed. For example, when a present vehicle speed is about 80 km/h, an end node may be an overspeed sign, and speed limit may be about 50 km/h, the target speed may be about 50 km/h. Therefore, until the vehicle speed decreases from about 80 km/h to about 50 km/h based on the map table, the distance calculation unit 230 may be configured to calculate a distance D3 in which coasting is available between a present vehicle position and the overspeed sign. Similarly, when the front side of a link is in a traffic congestion situation, the target speed may be a speed of a preceding vehicle. Therefore, the distance calculation unit 230 may be configured to calculate a distance D3 in which coasting is available based on the map table until a present vehicle speed reaches a speed of the preceding vehicle.

Figure 2:
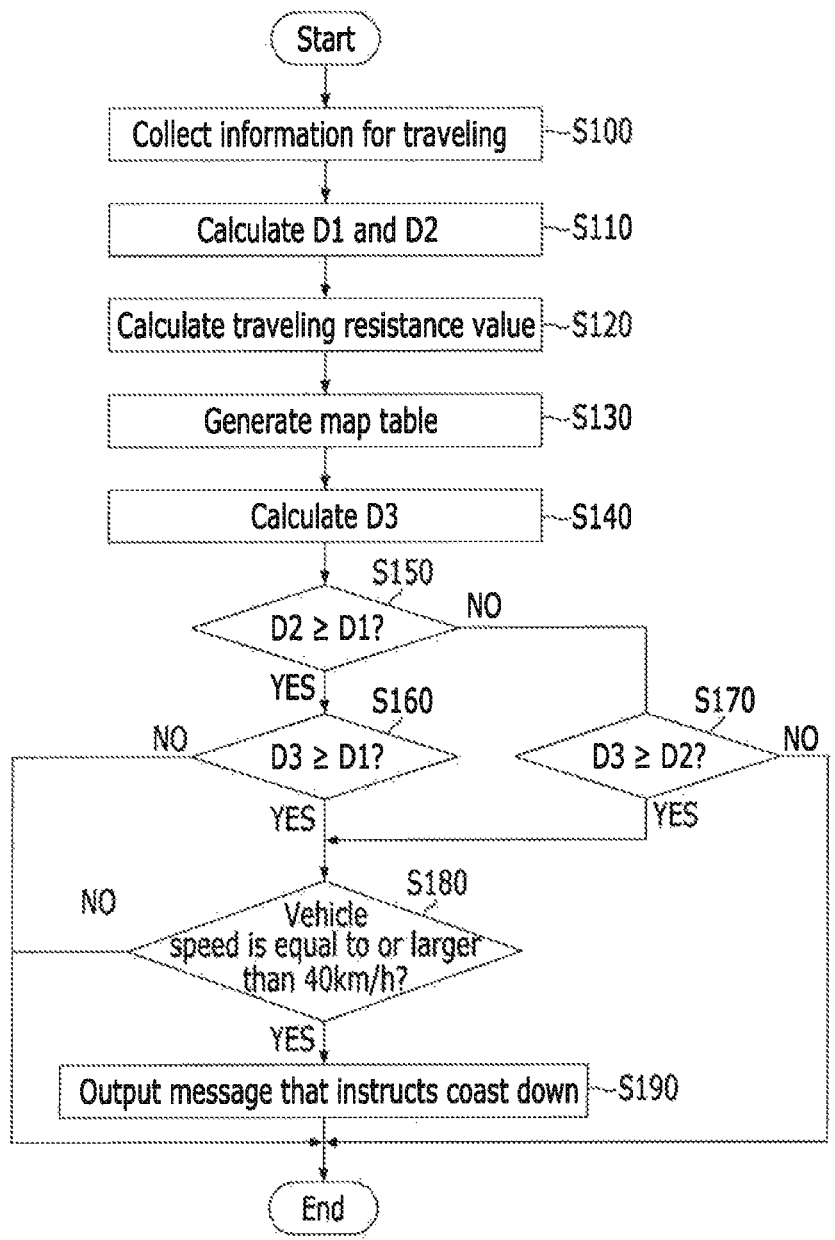
FIG. 2 is an exemplary flowchart illustrating a method of assisting a driver according to an exemplary embodiment of the present invention.

The determining unit 240 may be configured to compare a distance D1 between a present vehicle position and an end node, a distance D2 between a present vehicle position and a preceding vehicle, and a distance D3 in which coasting is available and compare a present vehicle speed and a predetermined target speed and thus may be configured to determine whether coasting is available, as described in FIG. 2. Additionally, the output unit 300, executed by the controller, may be configured to output a message that instructs coasting. The output unit 300 may be configured to provide a message that instructs coasting to a driver in various forms. For example, the output unit 300 may be configured to display a message that instructs coasting on a digital map or instruct coasting with sound via a speaker.

FIG. 2 is an exemplary flowchart illustrating a method of assisting a driver according to an exemplary embodiment of the present invention. Referring to FIG. 2, the information collection unit 100 may be configured to collect vehicle traveling information and transfer the information to the controller 200 (S100). The collected information may include vehicle position information, vehicle speed information, vehicle weight information, weather information, inter-vehicle distance information, three-dimensional geography information, and traffic information. The three-dimensional geography information may include node information, road slope information, and road curvature information.

The distance calculation unit 230 may be configured to calculate a distance D1 between a present vehicle position and an end node based on the node information and calculate a distance D2 between a present vehicle position and a preceding vehicle based on inter-vehicle distance information (S110). The traveling resistance calculation unit 210 may be configured to calculate a traveling resistance value based on the vehicle weight information, the weather information, the road slope information, and the road curvature information (S120). The map table generator 220 may be configured to generate a map table including a coasting distance that corresponds to a vehicle speed based on a traveling resistance value calculated by the traveling resistance calculation unit 210 (S130). The distance calculation unit 230 may be configured to calculate the distance D3 in which coasting is available until a present vehicle speed reaches a predetermined target speed based on the map table (S140). The determining unit 240 may be configured to determine whether the distance D2 between a present vehicle position and a preceding vehicle is equal to or greater than the distance D1 between a present vehicle position and an end node (S150).

When the distance D2 between a present vehicle position and a preceding vehicle is equal to or greater than a distance D1 between a present vehicle position and an end node, the determining unit 240 may be configured to determine whether the distance D3 in which coasting is available is equal to or greater than the distance D1 between a present vehicle position and an end node (S160). When the distance D3 in which coasting is available is equal to or greater than the distance D1 between a present vehicle position and an end node, the determining unit 240 may be configured to determine that coasting is available. When the distance D2 between a present vehicle position and a preceding vehicle is less than the distance D1 between a present vehicle position and an end node at step S150, the determining unit 240 may be configured to determine whether the distance D3 in which coasting is available is equal to or greater than the distance D2 between a present vehicle position and a preceding vehicle (S170). When the distance D3 in which coasting is available is equal to or greater than the distance D2 between a present vehicle position and a preceding vehicle, the determining unit 240 may be configured to determine that coasting is available.

In particular, the determining unit 240 may be configured to determine whether a present vehicle speed is equal to or greater than a predetermined speed and determine whether coasting is available (S180). When coasting is performed, a vehicle speed may deteriorate with a frictional force between the vehicle and a road surface. Therefore, the predetermined speed may be set to a speed in which a person of a common skill in the art determines in consideration of coasting. The predetermined speed may be about 40 km/h. When a present vehicle speed is equal to or greater than a predetermined speed, the determining unit 240 may be configured to determine that coasting is available. Thereafter, the output unit 300 may be configured to output a message that instructs coasting (S190).

Accordingly, according to an exemplary embodiment of the present invention, by providing a time in which coasting is available to a driver earlier than when depending on naked eye, a coasting distance may be increased significantly. Therefore, the driver may perform economical driving. Further, by increasing a coasting distance, fuel consumption may be improved. Particularly, in an electric vehicle, since energy consumption of the vehicle changes rapidly based on power traveling, regenerative braking, coasting, a wind direction, and a wind velocity, by increasing a coasting distance, energy consumption may be reduced. When using the driver assistance system according to an exemplary embodiment of the present invention, energy consumption may be decreased and thus real road traveling fuel consumption may be improved by about 3.5% or more.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:
1. A driver assistance system, comprising:
a memory configured to store program instructions; and
a processor configured to execute the program instructions, the program instructions when executed configured to:
receive vehicle traveling information;
determine whether coasting is available based on the received information; and
output a message that instructs coasting, when coasting is available,
wherein the received information includes vehicle position information, vehicle speed information, vehicle weight information, weather information, inter-vehicle distance information, three-dimensional geography information, and traffic information,
wherein the three-dimensional geography information includes node information, and the program instructions when executed are configured to calculate a first distance between a present vehicle position and an end node based on the node information and a second distance between the present vehicle position and a preceding vehicle based on the inter-vehicle distance information, and
wherein the three-dimensional geography information includes road slope information and road curvature information, and the program instructions when executed are configured to calculate a traveling resistance value based on the vehicle weight information, the weather information, the road slope information, and the road curvature information,
wherein the program instructions when executed are further configured to:
generate a map table of a coasting distance that corresponds to a vehicle speed based on the traveling resistance value and
calculate a third distance in which coasting is available until a present vehicle speed reaches a predetermined target speed based on the map table,
wherein the program instructions when executed are further configured to determine whether coasting is available by comparing the first distance between the present vehicle position and the end node, the second distance between the present vehicle position and the preceding vehicle, and the third distance in which coasting is available.

2. The driver assistance system of claim 1, wherein the program instructions when executed are further configured to:
- compare the first distance between the present vehicle position and the end node and the third distance in which coasting is available, when the second distance between the present vehicle position and the preceding vehicle is equal to or greater than the first distance between the present vehicle position and the end node; and
- determine that coasting is available, when the third distance in which coasting is available is equal to or greater than the first distance between the present vehicle position and the end node.

3. The driver assistance system of claim 1, wherein the program instructions when executed are further configured to:
- compare the second distance between the present vehicle position of and the preceding vehicle and the third distance in which coasting is available, when the second distance between the present vehicle position and the preceding vehicle is less than the first distance between the present vehicle position and the end node and
- determine that coasting is available, when the third distance in which coasting is available is equal to or greater than the second distance between the present vehicle position and the preceding vehicle.

4. The driver assistance system of claim 1, wherein the program instructions when executed are configured to determine that coasting is available, when the present vehicle speed is equal to or greater than a predetermined speed.

5. A method of supporting a driver, the method comprising:
- receiving, by a controller, vehicle traveling information;
- calculating, by the controller, a first distance between a present vehicle position and an end node and a second distance between the present vehicle position and a preceding vehicle based on the received information;
- calculating, by the controller, a third distance in which coasting is available until a present vehicle speed reaches a predetermined target speed;
- determining, by the controller, whether coasting is available based on the first distance between the present vehicle position and the end node, the second distance between the present vehicle position and the preceding vehicle, the third distance in which coasting is available, and the present vehicle speed; and
- outputting, by the controller, a message that instructs coasting, when coasting is available,
- wherein the collected information includes: vehicle position information, vehicle speed information, vehicle weight information, weather information, inter-vehicle distance information, three-dimensional geography information, and traffic information and
- wherein the determining of whether coasting is available includes:
- determining, by the controller, that coasting is available, when the second distance between the present vehicle position and the preceding vehicle is equal to or greater than the first distance between the present vehicle position and the end node, when the third distance in which coasting is available is equal to or greater than the first distance between the present vehicle position and the end node, and when the present vehicle speed is equal to or greater than a predetermined speed.

6. The method of claim 5, wherein the three-dimensional geography information includes road slope information and road curvature information, and
the calculating of the third distance in which coasting is available includes:
- calculating, by the controller, a traveling resistance value based on the vehicle weight information, the weather information, the road slope information, and the road curvature information; and
- generating, by the controller, a map table of a coasting distance based on a vehicle speed based on the traveling resistance value,
- wherein the third distance in which coasting is available is calculated based on the map table.

7. The method of claim 5, wherein the determining of whether coasting is available includes:
- determining, by the controller, that coasting is available, when the second distance between the present vehicle position and the preceding vehicle is less than the first distance between the present vehicle position and the end node, when the third distance in which coasting is available is equal to or greater than the second distance between the present vehicle position and the preceding vehicle, and when the present vehicle speed is equal to or greater than a predetermined speed.

8. A non-transitory computer readable medium containing program instructions executed by a controller, the computer readable medium comprising:
- program instructions that receive vehicle traveling information;
- program instructions that calculate a first distance between a present vehicle position and an end node and a second distance between the present vehicle position and a preceding vehicle based on the received information;
- program instructions that calculate a third distance in which coasting is available until a present vehicle speed reaches a predetermined target speed;
- program instructions that determine whether coasting is available based on the first distance between the present vehicle position and the end node, the second distance between the present vehicle position and the preceding vehicle, the third distance in which coasting is available, and the present vehicle speed;
- program instructions that output a message that instructs coasting, when coasting is available; and
- program instructions that determine that coasting is available, when the second distance between the present vehicle position and the preceding vehicle is equal to or greater than the first distance between the present vehicle position and the end node, when the third distance in which coasting is available is equal to or greater than the first distance between the present vehicle position and the end node, and when the present vehicle speed is equal to or greater than a predetermined speed.

9. The non-transitory computer readable medium of claim 8, wherein the collected information includes: vehicle position information, vehicle speed information, vehicle weight information, weather information, inter-vehicle distance information, three-dimensional geography information, and traffic information.

10. The non-transitory computer readable medium of claim 9, wherein the three-dimensional geography information includes road slope information and road curvature information.

11. The non-transitory computer readable medium of claim 10, wherein the calculation of the third distance comprises:
- program instructions that calculate a traveling resistance value based on the vehicle weight information, the weather information, the road slope information, and the road curvature information; and
- program instructions that generate a map table of a coasting distance based on a vehicle speed based on the traveling resistance value,
- wherein the third distance in which coasting is available is calculated based on the map table.

* * * * *